(12) United States Patent
Erforth et al.

(10) Patent No.: US 7,664,931 B2
(45) Date of Patent: Feb. 16, 2010

(54) SCALABLE AND CONFIGURABLE MULTIMEDIA SYSTEM FOR A VEHICLE

(75) Inventors: Thomas Erforth, Karlsruhe (DE); Matthias Rupprecht, Straubenhardt (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 11/173,266

(22) Filed: Jul. 1, 2005

(65) Prior Publication Data

US 2006/0095756 A1 May 4, 2006

Related U.S. Application Data

(60) Provisional application No. 60/584,934, filed on Jul. 1, 2004.

(30) Foreign Application Priority Data

Jan. 12, 2005 (EP) .................. 05000514

(51) Int. Cl.
*G06F 15/76* (2006.01)
(52) U.S. Cl. ............... 712/42; 712/1; 712/32; 712/43
(58) Field of Classification Search .......... 712/226
See application file for complete search history.

(56) References Cited

U.S. PATENT DOCUMENTS 5,809,262 A * 9/1998 Potter ................. 710/305

(Continued)

FOREIGN PATENT DOCUMENTS

EP 0 668 560 A2 8/1995

(Continued)

OTHER PUBLICATIONS

Dosaka et al., "A 90MHz 16M bit System Integrated Memory with Direct Interface to CPU", 1995, Symposium on VLSI Circuits Digest of Technical Papers, p. 19-20.*

(Continued)

*Primary Examiner*—Eddie P Chan
*Assistant Examiner*—William B Partridge
(74) *Attorney, Agent, or Firm*—Brinks Hofer Gilson & Lione (57) ABSTRACT

A scalable and fully configurable computing architecture for a mobile multimedia architecture used in a vehicle includes a head unit having a processor, a field programmable gate array and a memory. The processor and the memory are configured to communicate over a first bus that is a dedicated memory bus, and the processor and the field programmable gate array are configured to communicate over a separate second bus. The field programmable gate array is configured to be loaded from memory with part of a multimedia vehicle-related application-specific functionality that is executable by the field programmable gate array, and the processor is cooperatively operable with the field programmable gate array to execute another portion of the multimedia vehicle-related application-specific functionality. The multimedia vehicle-related application-specific functionality in the field programmable gate array may be changed with software and downloaded to the field programmable gate array in the field. In addition, due to the first and second busses being recognized industry standard busses, any of the processor, the field programmable gate array and the memory are fully scaleable and configurable.

23 Claims, 6 Drawing Sheets

U.S. PATENT DOCUMENTS

| | | | |
|---|---|---|---|
| 6,005,315 A * | 12/1999 | Chapman | 310/90.5 |
| 6,032,168 A * | 2/2000 | Ben-Arie et al. | 708/300 |
| 6,577,937 B1 | 6/2003 | Shuman et al. | 701/48 |
| 2003/0065432 A1 | 4/2003 | Shuman et al. | |
| 2004/0015656 A1* | 1/2004 | Rust et al. | 711/114 |
| 2004/0128563 A1* | 7/2004 | Kaushik et al. | 713/300 |
| 2004/0215987 A1* | 10/2004 | Farkas et al. | 713/300 |
| 2006/0123251 A1* | 6/2006 | Nakajima et al. | 713/300 |

FOREIGN PATENT DOCUMENTS

| | | |
|---|---|---|
| EP | 1 000 810 A2 | 5/2000 |
| WO | WO 99/48021 | 9/1999 |

OTHER PUBLICATIONS

"Reconfigurable Hardware Accelerator for Embedded DSP", by Keith Reeves, Ken Sienski and Calvin Field, Proc. SPIE vol. 2914, pp. 929-933, Oct. 1996.

Wishbone System-on-Chip (SoC) Interconnection Architecture for Portable IP Cores, Revision: B.3, released Sep. 7, 2002.

Parnell, K., "Reconfigurable Vehicles," Announcement, Xilinx, Inc. Nov. 19, 2001, pp. 1-16, © 2001 Xilinx, Inc., XP-001160504.

Parnell, K., "Telematics Digital Convergence—How to Cope with Emerging Standards and Protocols," Xilinx White Paper, May 27, 2003, pp. 1-10, © 2003, Xilinx, Inc., XP-002318756.

Ekas, P., "Leveraging FPGA coprocessors to optimize automotive infotainment and telematics systems," Embedded Computing Design [Online] Apr. 2004, pp. 1-5, XP002380638, URL http://www.embedded-computing.com/pdfs/Altera.Sum04.pdf.

Motz, Phil. et al. "Mobile Multi Media Open Computing Platform", SAE Technical Paper Series, 2001-01-090809, Mar. 5-8, 2001.

Nguyen, D. et al., A., Real-Time Sound Localization Using Field-Programmable Gate Arrays, Proceedings of the 2003 IEEE Conference on Acoustics, Speech, and Signal Processing (ICASSP 2003), Hong Kong, Apr. 2003. (4 pgs.).

V. Michael Bove, Jr., et al., "Media Processing with Field-Programmable Gate Arrays on a Microprocessor's Local Bus," *Proc. SPIE Media Processors*, 3655, 1999. (7 pgs.).

Crest Audio Selects Actel's Proasic $^{Plus}$ FPGAS for Advanced Multichannel Digital Amplifier Products (May 11, 2004) http://www.actel.com/company/press/2004pr/CrestPAplus.html (2 pgs.).

* cited by examiner

SCALABLE AND CONFIGURABLE MULTIMEDIA SYSTEM FOR A VEHICLE

PRIORITY CLAIM

This application claims the benefit of U.S. Provisional Application No. 60/584,934, filed Jul. 1, 2004 and European Patent Application 05000514.9 filed Jan. 12, 2005. The disclosure of the above applications is incorporated herein by reference.

BACKGROUND OF THE INVENTION

1. Technical Field

The present invention relates to mobile multimedia systems used in vehicles and in particular, to a computing architecture for such system.

2. Related Art

Multimedia navigation systems have recently found a high use and demand as they conveniently combine telematic, navigation and entertainment functions for the driver and other passengers of vehicles. In present systems, customer requirements are satisfied by providing a hardware platform for realizing various functions and components, such as a radio, a compact disc (CD) or a digital video/versatile disc (DVD) player, a telematics module, a navigation unit, a television (TV) and/or an audio receiver. Enhanced systems provide professional sound combined with speech dialogue systems or other user interfaces to control the individual components and functions of the multimedia navigation system itself or other car body functions like climate control. In general, these systems may also include a data network comprised of a plurality of interconnected processors, sensors and databases to realize various vehicle operations, such as cruise control, automated mayday and obstacle/collision warning systems, among others.

Typically, such systems are custom built for vehicles by interfacing the individual products of many different manufacturers. Accordingly, once the requirements for a particular system are established, hardware and software must be located and procured to fulfill the requirements. In addition, compatibility and functionality issues among the various hardware and software components must be addressed to make the system fully functional. As such, the building of such a system requires significant system specific engineering and/or customization. Due to wide variations in requirements and ever changing improvements in hardware and software, such vehicle-specific highly customized systems are difficult to change or upgrade, and may not be applicable to the requirements of a different vehicle. Accordingly, each customized system requires similarly intensive and relatively inefficient design and engineering efforts to design and/or upgrade the system.

SUMMARY

The present invention provides a computing architecture that offers flexibility and scalability with functionality and features that allow a functional enhancement of products already in field use. In addition, the functionality may be modified during development without re-working the hardware concept. The open and scalable hardware architecture may be realized by implementing additional multimedia and/or vehicle related functionality in a field programmable gate array. Upon system startup or during system operation, the field programmable array may load data from memory to realize application-specific functionality. As this functionality may be easily updated by loading updated software into memory, flexibility and scalability in terms of function and features is attained.

The computing architecture includes a mobile multimedia system for use in a vehicle. The mobile multimedia system includes a head unit installable in the vehicle. The head unit includes a processor in communication with the field programmable gate array over a recognized industry standard communication bus that is operable with a predefined industry standard protocol. Memory internal or external to the head unit may store multimedia vehicle related functionality in the form of instructions that are downloadable into the field programmable gate array by the processor. In addition, the memory may store instructions that are executable by the processor. Due to the recognized industry standard communication bus, the processor(s) and field programmable gate arrays(s) may be supplied by one or more different manufacturers with interchangeability among similarly performing components without customized reengineering.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
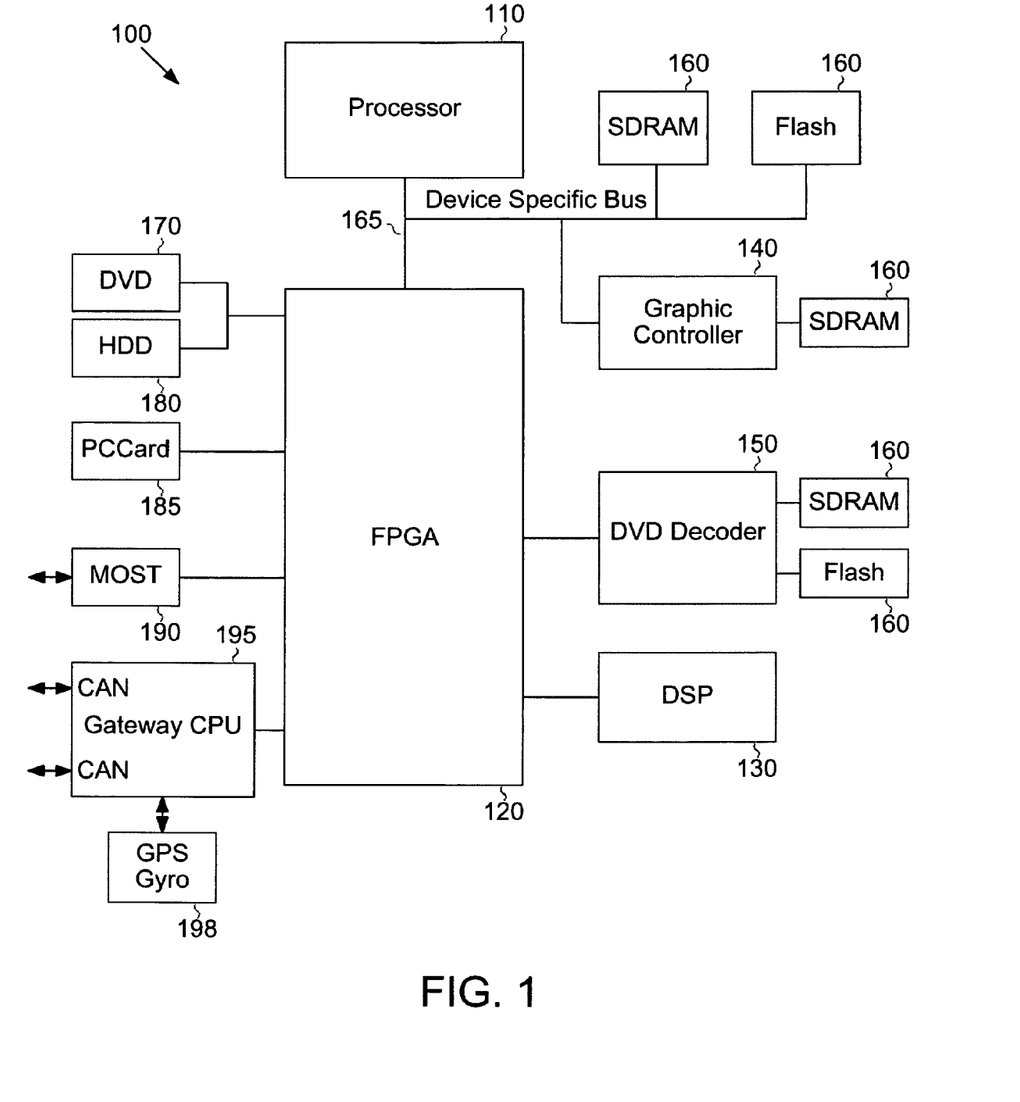
FIG. 1 shows a computing architecture for a mobile multimedia system for a vehicle.
Figure 2:
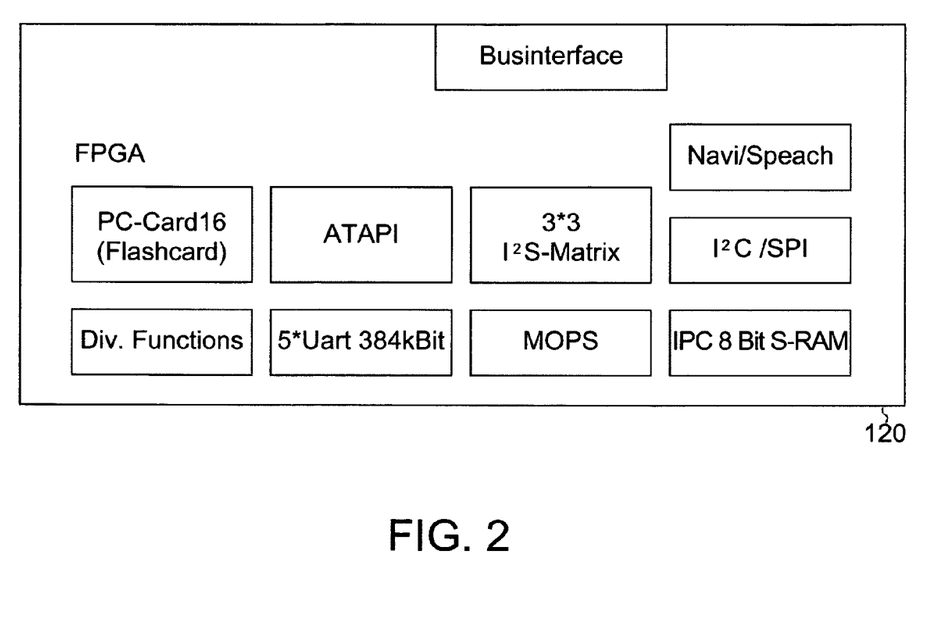
FIG. 2 illustrates further details of the computing unit shown in FIG. 1.

FIGS. 1 and 2 show details of an example computing architecture including modules and electrical components interconnected by data buses to realize various functions of a mobile multimedia system for a vehicle. The architecture also includes interface modules for providing a connection to external components. More specifically, a computing unit 100 includes a main processor (CPU) 110, a field programmable gate array (FPGA) 120, a digital signal processor (DSP) 130, a graphic chip 140 and a digital video disc (DVD) decoder chip 150. The CPU 110, the graphic chip 140 and the DVD decoder 150 may be assigned external memory 160.

Corresponding memory busses having a predetermined size such as 8, 16, 32 or 64 bits may be provided for exchange of data between the memory 160 and the CPU 110. Exchange of data between the CPU 110, the FPGA 120, the DSP 130, the graphic chip 140 and the memory 160 may be realized by a processor local bus that is a device specific bus 165. All communication between the CPU 110, the FPGA 120, the DSP 130, the graphic chip 140 and the memory 160 occurs over the device specific bus 165.

As further apparent from FIG. 1, the FPGA 120 may communicate with various external devices and interfaces including DVD 170 or hard disk drive (HDD) 180. The connection is realized, for instance, by an ATAPI (AT attachment packet interface) interface between the FPGA and the DVD/HDD drive. Moreover, through means of a PC-card standard bus, the FPGA 120 may communicate with a memory card, such as a PCMCIA card. Further interconnections are provided to a media oriented system transport (MOST) interface unit 190 and a controller area network (CAN) gateway CPU interface module 195. Finally, a connection to a global positioning system (GPS) module using, for instance, a universal asynchronous receiver-transmitter (UART) protocol is provided.

FIG. 2 shows details of the computing unit 100 and in particular, illustrates the functionality provided in the FPGA 120 using example interface modules. With even faster processors in the small scale parts, additional integrated circuit components may be placed on the circuit board to realize enhanced functionality. This may render the overall system complex and less flexible in terms of exchanging and enhancing individual functions. Hence, the implementation of a new function becomes very difficult, if not impossible, when it must be implemented in hardware. This problem may be further aggravated by the shortened schedule lifetime. Some functions and requirements, such as audio and video compressing and decoding can be changed to newer industry standards. When this occurs, it would be a huge benefit to have the capability to upgrade to the new standards in the field; however this is presently only possible by exchanging a complete circuit board that includes the upgraded portions of the system.

Figure 3:
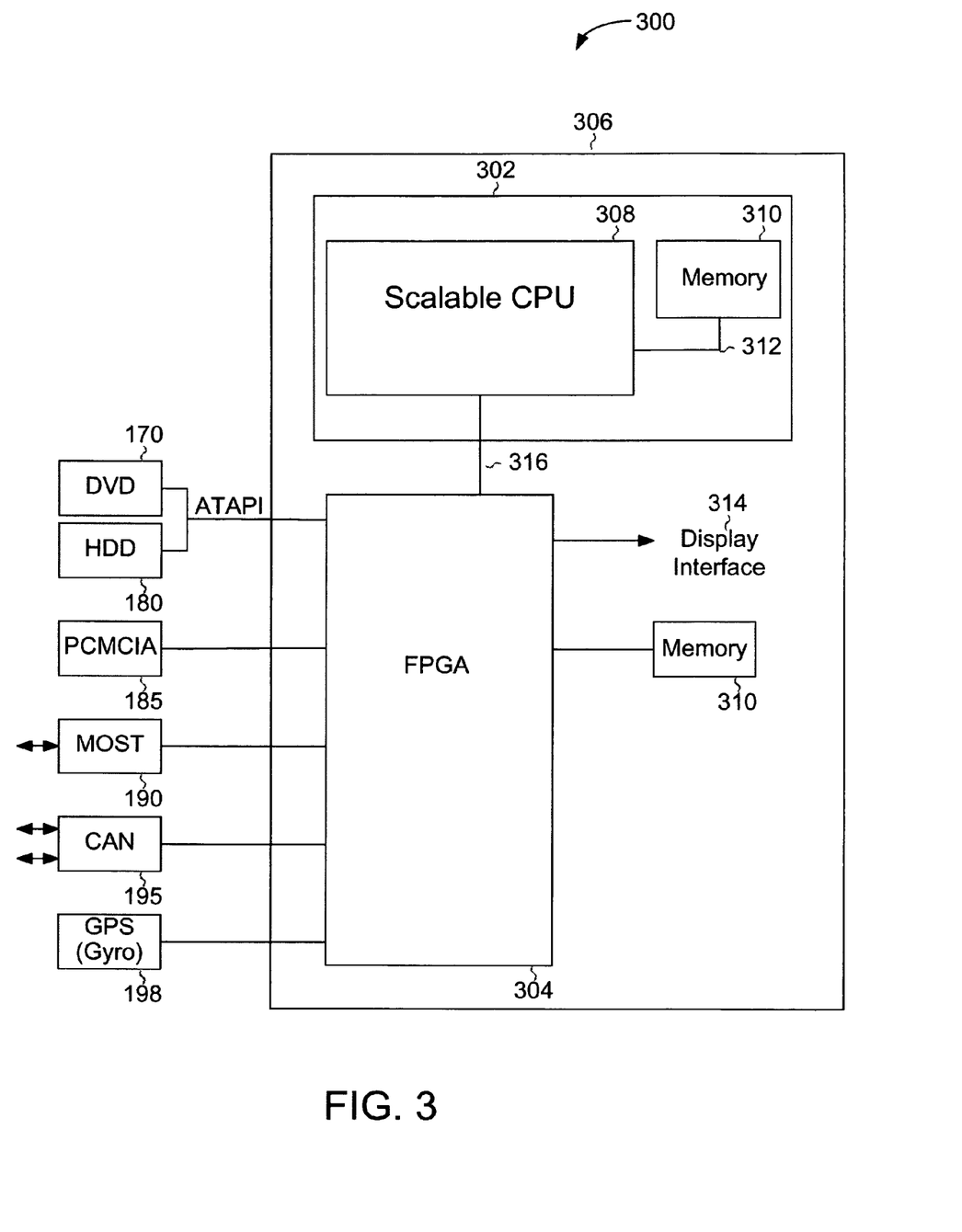
FIG. 3 illustrates the computing architecture of a mobile multimedia system for a vehicle.

FIG. 3 illustrates an example computing architecture 300 for a mobile multimedia navigation system. The computing architecture 300 includes a processing unit 302 and a field programmable gate array (FPGA) 304 included in a head unit 306. The head unit 306 may be installed in a vehicle to provide a human machine interface (HMI) to the vehicle as well as control and/or coordinate overall operation of the vehicle and/or the multimedia vehicle based system. The processing unit 302 may include one or more CPUs 308 and a memory 310. The processing unit 302 may be scaleable to accommodate various levels of processing power according to the computing needs of a particular system. Scalable performance can be achieved by, for example, changing the clock frequency and/or the number of processors, or varying the available memory size. Accordingly, the CPU 308 may be scaleable, such as from 300 to 2500 million instructions per second (MIPS).

The memory 310 may be one or more data storage devices that store instructions accessible by the CPU 308. The instructions may be representative of one or more multimedia applications. As used herein, the term "multimedia application" or "multimedia applications" refers to software code that is executable to provide functionality related to audio and/or video processing in a vehicle. The term "application" refers to interrelated instructions that are executable to cooperatively operate and perform some form of audio and/or video related processing.

The memory 310 may be at least one electronic memory device such as flash memory, random access memory (RAM), etc. For example, the memory 310 may be a double date rate (DDR) RAM of 128 MB×32 and a Flash memory of 256 MB×32. The memory 310 may be located within the CPU 308. Alternatively, or in addition, the memory 310 may be externally located anywhere outside the CPU 308 that allows communication with the CPU 308. In another alternative, a portion of the memory 310 may be located within the CPU 308 and other portion(s) of the memory 310 may be located elsewhere.

Communication between the CPU 308 and the memory 310 may be over a dedicated memory bus 312. Accordingly the memory bus 312 may be optimized for communication of instructions and other data between the CPU 308 and the memory 310. The memory bus 312 may be a recognized industry standard memory bus operable with a recognized industry standard memory bus protocol, such as a standardized memory bus and protocol described by a JEDEC Solid State Technology Association standard. Accordingly, memory devices from different manufactures and CPUs from different manufactures may be configured with relatively minimal engineering design effort to communicate on the standardized memory bus 312. Due to the standardized communication, interchangeability of CPUs 308 and memory 310 provided by different manufacturers is achieved without substantial design, redesign and/or engineering to enable communication over the memory bus 312.

The illustrated computing architecture 300 offers flexibility and scalability in terms of function and features to allow a functional enhancement for products already in field use, and even to modify a component during development without re-working the hardware concept. The flexibility and scalability is provided by the open and scalable hardware architecture that may be realized by implementing functionality in the FPGA 304. Upon system startup or system operation, the FPGA 304 may load data from memory 310 to realize multimedia vehicle-related application-specific functionality. As this functionality may be easily updated by loading updated instructions into memory 310, a high level of flexibility and scalability in terms of function and features may be attained. This concept may be considered as "soft-wired" function blocks or components that may be selectively included in the FPGA 304.

The FPGA 304 may additionally serve as a scalable hardware interface between the processing unit 302 and peripheral components included in the vehicle and/or the multimedia system. In the illustrated example, the peripheral components include the DVD 170, the HDD 180, the PCMCIA card 185, the MOST interface 190, the CAN interface module 195 and the GPS gyro 198. In addition, at least a portion of the memory 310 may be accessible with the processing unit 302 via the FPGA 304. Further, the FPGA 304 may include a display interface 314 capable of driving a display, such as a liquid crystal display included in the vehicle. Such a display may be used to display video content, navigation content, web pages, or any other visual content. In other examples, powertrain parameters/control, human machine interface (HMI), climate control, and/or any other vehicle related peripheral components may be interfaced with the processing unit 302 by the FPGA 304.

The computing architecture 300 may also be adapted in a manner that system functions, such as graphic/video processing, DVD decoding or DSP functions are shared between the application software running on the central processor(s) 308 and the FPGA 304. For example, the FPGA 304 may perform pre-processing or post processing of input/output data that is also processed by the processing unit 302. In this way, a flexible implementation of functions performed by what were previously hardware-based modules may be implemented in software in the FPGA 304. Such functions may include graphic related tasks, navigation related tasks, speech dialogue system related tasks, DVD decoding related tasks, telephone base band functions including noise cancellation, etc.

Thus, what would otherwise be separate hardware based components interfaced to the computing architecture 300 may be implemented as software components in the processing unit 302 and the FPGA 304 to significantly reduce the need for customized interfaces and engineering. Instead of proprietary and manufacturer specific communication/interface requirements, raw signals may be provided to the FPGA 304 from external hardware devices and the FPGA 304 may produce output signals to drive external hardware devices.

For example, in a vehicle that includes a rear back up camera, instead of receiving decoded signals capable of being passed through to drive a display, which may require significant customized engineering to develop an interface, raw video input signals may be provided to the FPGA 304. The FPGA 304 may include a video decoder component to decode the raw signals. The decoded raw signals may then be provided to the processing unit 302 for additional processing to add additional information, such as an estimated distance from the vehicle to an image, such as a tree, depicted in the video data. The decoded video signal and the additional information may be provided back to the FPGA 304. The FPGA 304 may include graphics controller functionality that is executable to drive an external display to display, for example, the images captured with the video camera and a distance to the displayed images. Accordingly, since raw video signals are used, any video camera may be simply and efficiently interfaced to the computing architecture 300.

Time-critical or computing intensive functions also may be realized by means of dedicated hardware accelerators included in the FPGA 304. Hardware accelerators provide accelerated signal processing functions that may result in an increase in performance. The computing architecture advantageously reduces the amount of hardware and integrated circuits previously necessary to enable the respective functionality. This leads to cost savings and independence from specific manufacturers providing parts, such as graphic and controller chips. Moreover, the design of the computing architecture 300 becomes extremely flexible and scalable while the overall system performance is increased.

The processor 302 and the FPGA 304 are connected via a standardized peripheral bus system 316. The standardized peripheral bus 316 allows scalability in terms of number of processors and data transfer rate. Data can be exchanged between multiple processors 302 and/or FPGA's 304 with the intention to process the data at the source either in software on the central processor units 308 or in hardware accelerators in the FPGA 304 to minimize the data streams communicated over the standardized peripheral bus 316. The usage of a predefined standardized bus system minimizes the amount of development work for the components interfacing and provides independence from processor manufacturers. Accordingly, the usage of two different processors from different manufacturers is possible. The standardized peripheral bus 316 may allow similar interchangeability among field programmable gate arrays 304 provided by different manufacturers.

For example, a computing architecture 300 that includes a first processor from a first processor supplier may be implemented in a head unit of a vehicle. The first processor may be implemented to communicate over the recognized industry standard communication bus with a FPGA also implemented in the head unit. Due to the functionality required in the head unit of this example, it is determined that the first processor lacks sufficient computing power to provide the desired performance. Thus, a second processor from a second different processor manufacturer may be implemented in the head unit to communicate over the recognized industry standard communication bus with the first processor and the FPGA. Due to the communication bus being a recognized industry standard communication bus, both the first and second processors and the FPGA may be efficiently and relatively simply configured to communicate.

Example recognized industry standard communication busses include a peripheral component interface (PCI) bus and a PCI-X bus. Typically, a PCI bus transmits 32 bits at a time in a 61-pin connection and 64 bits in a 100 pin connection in an expanded implementation (PCI-X). The PCI bus uses all active paths to transmit address and data signals, sending the address on one clock cycle and data on the next. In other examples, other recognized industry standard communication busses, such as PCI express may be used.

In FIG. 3, the main difference to the computing architecture illustrated in FIG. 1 lies in the extended functionality of the FPGA 304 and the configuration of the busses in the computing architecture. In FIG. 1, the memory 160 and the other peripheral devices all communicate over the single device specific bus 165. In FIG. 3, the memory 310 and the FPGA 304 each communicate on wholly separate buses with the processing unit 302. Specifically, the memory 310 and the CPU 308 communicate on a first bus that is a dedicated memory bus 312, and the FPGA 304 and the CPU 308 communicate on a second bus that is the standardized peripheral communication bus 316. Communication with peripheral devices is typically slower than communication with memory. Since the computing architecture separates memory communications from peripheral communications each of the memory bus 312 and the standardized peripheral communication bus 316 may be speed optimized.

In configurations where the memory and the peripherals communicate on the same bus, as in FIG. 1, the size of the bus is usually relatively large to accommodate the traffic. As the bus is made larger, capacitance increases and the signals communicated over the bus are weaker. Thus, higher frequency signals used to increase bus speed may become too weak. Since the memory bus 312 is separate, the memory bus 312 may operate at a first voltage, such as about 1.8 volts or about 2.5 volts, while the standardized peripheral bus 316 may operate at a second voltage that is higher, such as about 3.3 volts. Accordingly, the use of a dedicated memory bus 310 and a separate and distinct peripheral bus 316 in an embedded device may provide a significant improvement in performance. In addition, since both the memory bus 310 and the peripheral bus 316 are recognized industry standard buses, interchangeability of components communicating over the buses, scalability and flexibility are maximized.

The FPGA 304 may optionally include a hard-wired processor core and for instance, have a predetermined capacity of gates, such as 200,000 to 1,000,000 gates. Generally, FPGA denotes an integrated circuit that is programmable in the field, i.e. by a system manufacturer. An advantage of the FPGAs is the possibility of remotely upgrading the hardware already installed in the system. Rather than manual replacement of the electronic circuit board, the user of FPGAs is allowed to update the hardware remotely in the same manner as performing a software upgrade. Thus, FPGAs theoretically allow unlimited reprogramming and reconfiguration in a fast, relatively simple and cost effective manner. More information, e.g. circuit diagram details on FPGAs, is available from manufacturers of FPGAs, such as ACTEL Corporation of Mountain View California, ALTERA Corporation of San Jose Calif., ATMEL Corporation of San Jose California, CYPRESS SEMICONDUCTOR Corporation of San Jose California, LUCENT TECHNOLOGIES of Murray Hill N.J., and XLINX Incorporated of San Jose Calif.

As a general overview, most FPGAs follow a common approach: a regular, flexible, programmable architecture of configurable logic blocks surrounded by a perimeter of programmable input/output blocks. These functional elements are interconnected by a powerful hierarchy of versatile routing channels. Values stored in static memory cells control all configurable logic elements and interconnect resources. These values may be loaded into the memory cells on power-up and can be reloaded, if necessary, to change the function of the device. The previously described architecture has been implemented by, for example, SPARTAN-II FPGAs, a device family launched by XILINX Incorporated.

Figure 4:
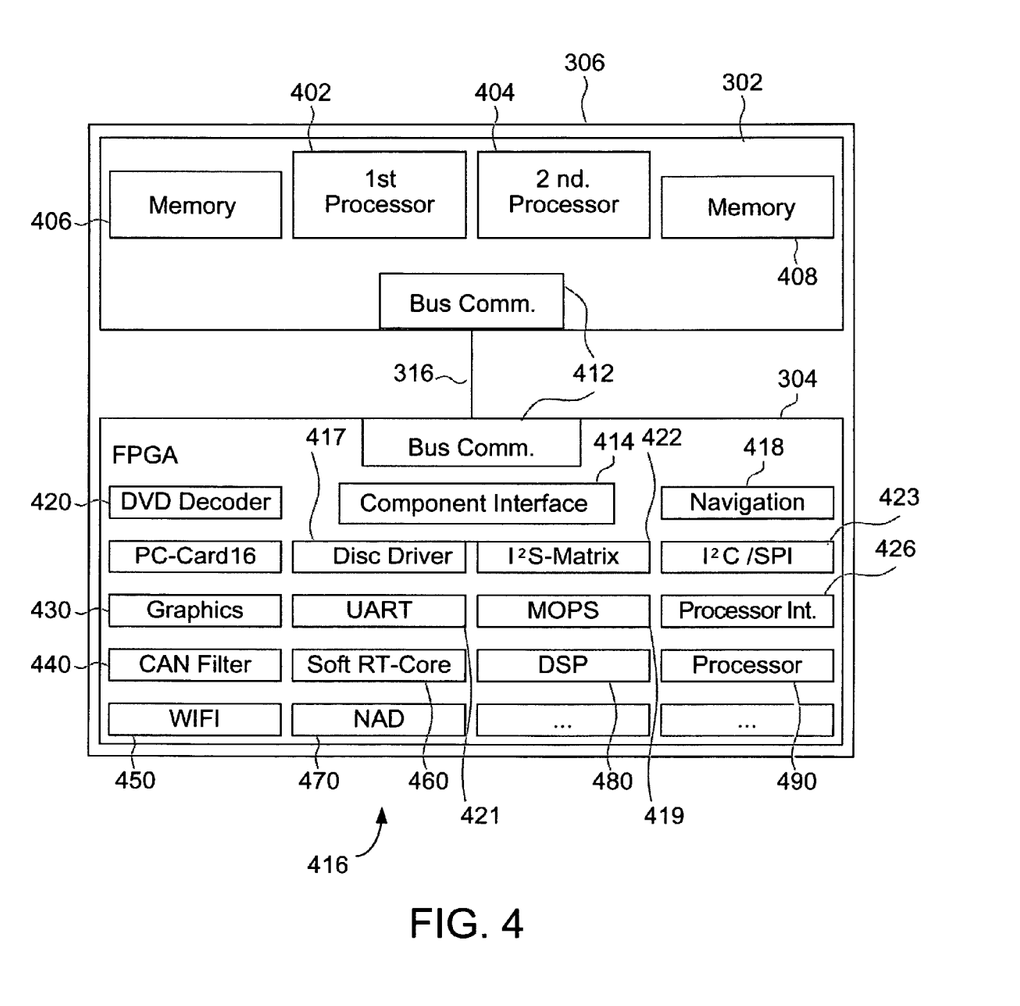
FIG. 4 shows details of the computing unit shown in FIG. 3.

FIG. 4 is a more detailed block diagram of the computing architecture included in FIG. 3 that includes the processing unit 302 and the FPGA 304. In one example, the processing unit 302 includes a first central processor unit 402 and a second central processor unit 404. The processing unit 302 may also include first and second memory 406 and 408 that correspond to the respective first and second central processor units 402 and 404. Alternatively, the first and second central processor units 402 and 404 may share the first and second memory 406 and 408. In this configuration, high priority or real-time applications may be assigned to the first central processor unit 402, while lower priority applications may be assigned to the second central processor unit 404. Such an architecture may significantly reduce the startup time for the system, which is a highly demanding feature for a mobile multimedia system. To synchronize operation, the central processor units 402 and 404 may be configured in a master slave configuration where the first central processor unit 402 may be the master. Alternatively, the first and second central processor units 402 and 404 may be configured in a peer-to-peer configuration with control of communication on the bus being performed jointly, with one of the central processor units 402 and 404 or with the FPGA 304.

Upon completion of system startup, applications being executed may be transferred from one central processor unit 402 and 408 to another to achieve improved balancing of tasks between the central processing units 402 and 408. Thus, the individual loading imposed upon each central processor unit 402 and 408 may be more easily leveled by means of an intelligent task management component included in one of the first and second central processor units 402 and 404. Alternatively, the intelligent task management component may be included in the FPGA 304. The applications may be transferred using the standardized peripheral bus 316.

The dual central processor units 402 and 404 architecture may make an extremely short start/up time possible. This highly demanded feature may be realized by different strategies. For instance, as soon as the system has to start up, one central processor unit can provide basic and safety critical functions like network communication or parking distance control, whereas the second central processor unit can prepare non time critical but nevertheless computing intensive functions like DVD Video play. Another possibility is to use a processor included in the FPGA 304 to perform a quick start-up whereas the central processor units 402 and 404 of the processing unit 302 may start in a proper order without acceleration.

Furthermore, the dual central processor units 402 and 404 approach allows the distribution and execution of applications on different central processor units depending on their priority. For instance, all high priority tasks (e.g. CAN gateway or safety applications) or real time applications may share one central processor unit. For this central processor unit, the necessary computing power for all applications may always be available. The non-critical applications may share the second central processor unit. In this way both demands for real time and numerous applications may be satisfied.

In one example, at least one of the central processor units 402 and 404 and the memory 406 and 408 assigned thereto may be integrated in a case on a main board, or in a case on a module on the main board or in any other mounting configuration. Alternatively, the central processor units 402 and 404 and the memory 406 and 408 assigned thereto may be integrated either on a module or directly on a mainboard in die-onboard technology. The die-on board technology may reduce EMI and allow more efficient cooling techniques. Efficient cooling techniques may be desired with increasing central processor unit clock frequencies. Board size and therefore cost may be reduced. The integration on a module increases the reusability of already designed parts and therefore reduces the development time and failure rate. Further integration and cost reduction can be achieved by integrating the two central processor units 402 and 404 on one die.

The processing unit 302 may also include a bus communication module 412. The bus communication module 412 may be the interface to allow communication over the standardized peripheral bus 316. The bus communication module 412 may communicate with a predefined recognized industry standard protocol, such as a PCI protocol. The FPGA 304 may similarly include a bus communication module 412 to enable communication over the standardized peripheral bus 316. In addition, the FPGA 304 includes a component interface 414. The component interface 414 may provide an interface between the bus communication module 412 and a plurality of components 416 included in the FPGA 304. The component interface 412 may be a general purpose interface that provides a recognized industry standard for data exchange between intellectual property (IP) core components, such as the bus communication module 412 and the components 416. The component interface 414 may also allow the components to be added and deleted from the FPGA 304 without changes to the component interface 414. An example component interface 414 is a WISHBONE system-on-chip (SoC) interconnection architecture.

Information received over the standardized peripheral bus 316 may be temporarily cached, or stored, in the bus communication module 412 and then transported to the component interface 414. The component interface 414 may convert the information in the standardized bus protocol to a standardized component protocol. The standardized component protocol may be a recognized industry standard protocol capable of enabling communication with all of the components in the FPGA 304.

The components 416 included in the FPGA 304 may be loadable as programmable hardware into the FPGA 304 upon startup and/or during operation. The components may each be different independently operable functions. In the illustrated example, the FPGA 304 includes a digital signal processing component 480, a digital data disc drive component 417 and a vehicle navigation component 418. In addition, the FPGA 304 may be downloaded with components that include a MOST interface component 419 that may be used to implement additional functionality in the computing architecture. Further, the FPGA 304 may be downloaded with components that include a universal asynchronous receiver-transmitter (UART) component 421, an $I^2S$ matrix component 422, a $I^2C$/SPI component 423, a graphics component 430, a CAN filtering component 440, a wireless LAN WIFI interface component 450, a Network Access Device (NAD) component 470 and a DVD decoder component 420. The example components downloadable to the FPGA 304 are a non-exhaustive list, and other components may also be downloadable to the FPGA 304.

The digital signal processing component 480 may be a programmable software DSP. The digital disc drive component 417 may be a drive interface, such as an ATAPI interface to a CD drive, or a DVD drive. The digital disc drive component 417 may be executable by other components in the FPGA 304. The vehicle navigation component 418 may include executable functionality that provides a display of navigation information using the graphics component 430. In addition, the vehicle navigation component 418 may include stored audio sequences (synthesized voice), accessibility to the navigation data using the digital data disc drive component 417, and the capability to drive loudspeakers coupled with the head unit 500.

The components 416 downloaded to the FPGA 304 may be entire multimedia applications or portions of multimedia applications. Components 416 within the FPGA may also be portions of multimedia applications that can be shared among different multimedia applications. For example, the vehicle navigation component 418 may be configured to access a data disc for navigation related information, and the DVD decoder component 420 may access a data disc for video and/or audio data. Both the vehicle navigation component 418 and the DVD decoder component 420 may use the digital disc drive component 417 to interface with respective disc drives to access such data discs. In another example, the vehicle navigation component 418 may display navigation information on a display and the DVD decoder component 420 may display images on a display. Both the vehicle navigation component 418 and the DVD decoder component 420 may use the graphics component 430 to drive respective displays. The FPGA 304 may also include an on-chip processor 490, such as a hardwired central processor unit, a processor interface 426, such as an IPC 8 bit S-RAM to communicate with the external processor. An example external processor is a CAN gateway CPU interfaced with the CAN interface module 195 illustrated in FIG. 1. The FPGA 304 may include a hardwired of softwired DSP 480 and/or processor 490. Accordingly, the processor 490 may be used to perform the functionality of the processing unit 302.

Digital signal processing functions that can be realized in the FPGA 304 may include sample rate conversion and/or compressed audio decoding, such as decoding MP3, windows media audio (WMA), or advanced audio coding (AAC). Functionalities that may be realized in the FPGA 304 relating to DVD include, for example, video and audio signal decoding or decompression techniques, such as MPEG2 or MPEG4. Graphic processing output tasks implemented in the FPGA functionality may include, for example, frame buffer control, bit block transfer, alpha blending, and display interface control. In addition, serial interfaces may be realized with the FPGA 304 by, for example, universal asynchronous receiver-transmitter (UART), such as a 5 times 384 kBit UART, interIC (I2C), or serial peripheral interface (SPI). Further, network interfacing may be implemented in the FPGA 304 using techniques, such as MOST, CAN message filtering and/or a CAN-MOST gateway.

Figure 5:
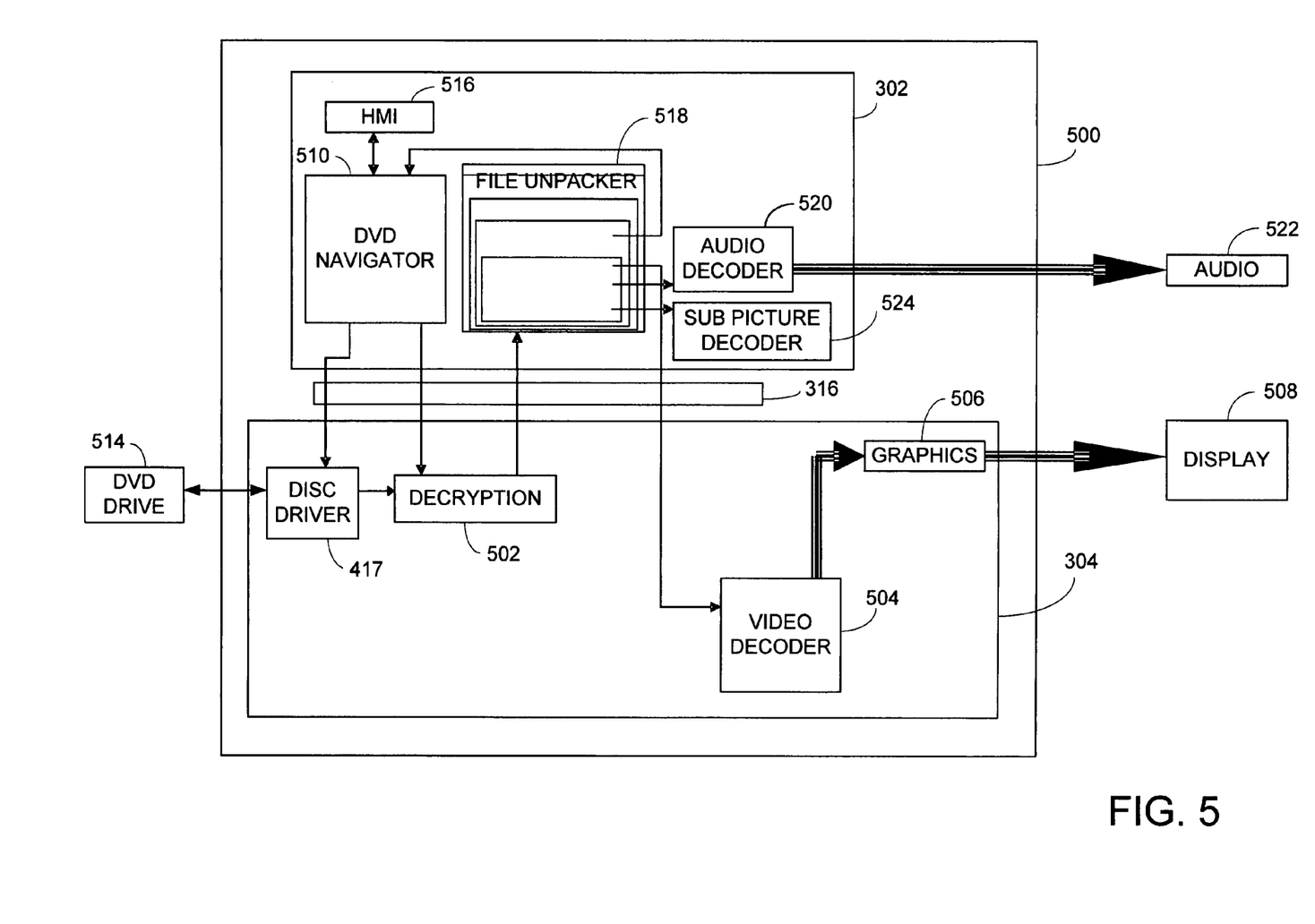
FIG. 5 shows a block diagram of a portion of a computing architecture of a mobile multimedia system for a vehicle.

FIG. 5 is a block diagram illustrating an example application that is shared between the processing unit 302 and the FPGA 304 via the standardized peripheral bus 316 within a head unit 500. In this example, instead of a separate DVD decoder that provides decoded audio and/or video data, much of the DVD functionality may be implemented in a combination of the processing unit 302 and the FPGA 304.

Functionality of the processing unit 302 and the FPGA 304 that is configured to cooperatively operate using a shared DVD related application is illustrated. The FPGA 304 includes a first portion of the application that includes a digital data disc drive component 417, a decryption component 502, a video decoder component 504 and a graphics component 506. The digital data disc drive component 417 may be a drive interface, such as an ATAPI, realized in programmable hardware within the FPGA 304. The decryption component 502 may be a decryption function also realized in programmable hardware included in the FPGA 304. The video decoder 504 may decode video signals. The graphics component 506 may be a 2D graphic function realized in programmable hardware included in the FPGA 304. The graphics component 506 may add sub picture and other graphics to a video image. In addition, the graphics component 506 may also include functionality to scale the image to a display resolution and generate a control interface to a display 508.

The processing unit 302 includes a second portion of an application that may include a DVD navigator 510. The DVD navigator 510 may be an executable control unit to activate a DVD drive 514 that is external to the head unit 500 using the digital data disc drive component 417 to access a file on a disc in the DVD drive 514. The executable functionality of the DVD navigator 510 may also include the generation of encryption keys, the control of the decoders, playability, error handling and authentication. In addition, the DVD navigator 510 may include menu functionality and an interface to a human machine interface 516 that is executable with the processing unit 302 as part of the second portion of the application. An audio decoder component 520 may also be included within the processing unit 302. The audio decoder component 520 may include executable functionality to decode compressed audio. The decoded audio may be provided and output on an audio output line 522. The processing unit 302 may also include a sub picture decoder component 524 that includes executable functionality to decode sub pictures. The audio decoder component 520 and the sub picture decoder component 524 may also be part of the second portion of an application.

The processing unit 302 may also include a file unpacker component 518 that includes executable functionality to unpack and assign video files and file contents to different addresses. The file unpacker module 518 includes a plurality of categories of video and/or audio files, such as audio, video, video plus audio, etc., that may each include a number of files identified as falling with the respective category. The file unpacker component 518 may also be part of the second portion of an application.

Figure 6:
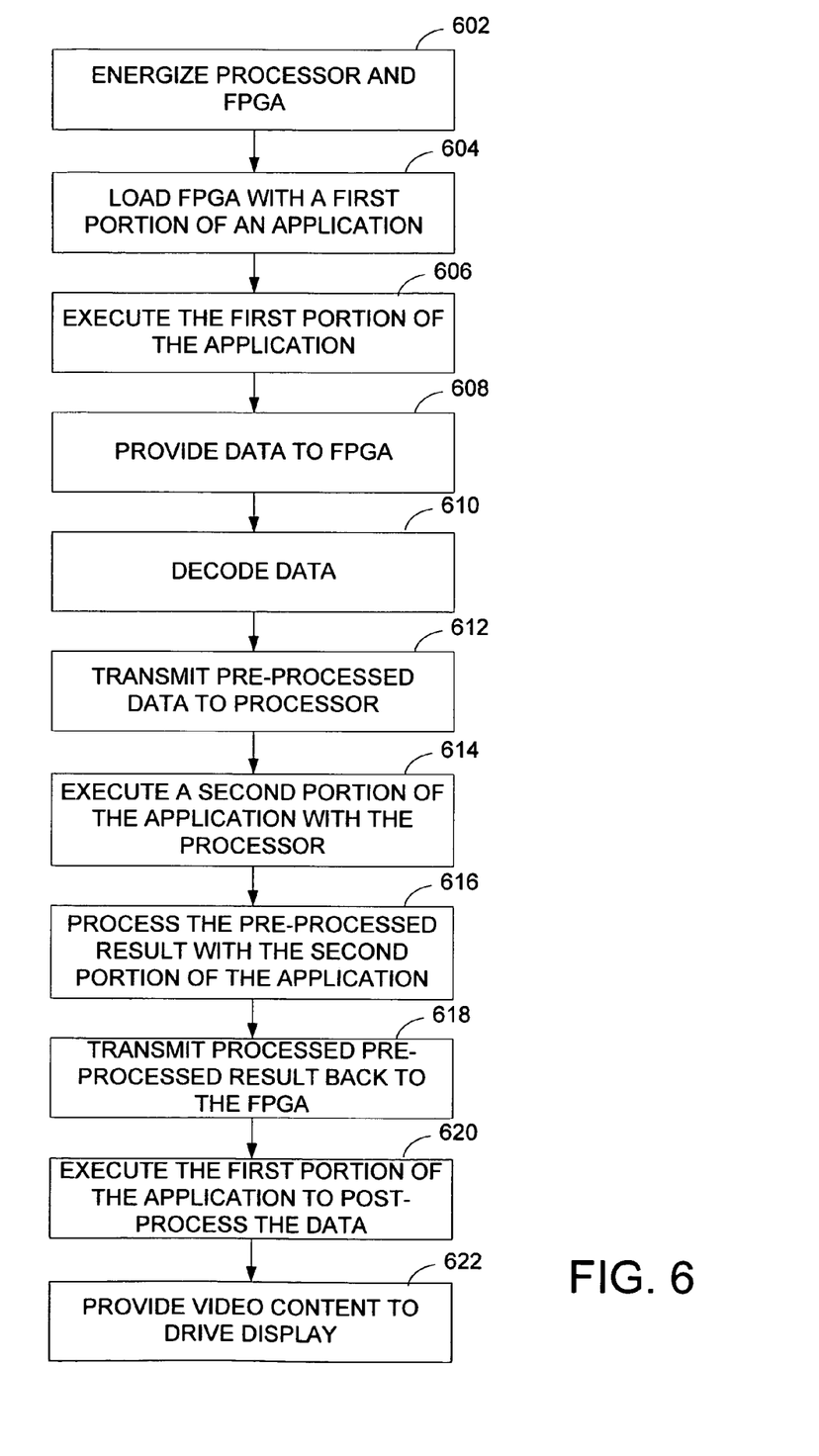
FIG. 6 is a operational flow diagram for the computing architecture of FIGS. 3-5.

FIG. 6 is an example operational flow diagram of the head unit 500 and DVD driver 514 illustrated in FIG. 5. At block 602, the processing unit 302 and the FPGA 304 are energized. The FPGA 304 is loaded by the processing unit 302 with instructions representative of one or more applications and/or portions of applications by communicating the instructions over the memory bus 312 and the standardized peripheral bus 316 at block 604. In this example, the FPGA is loaded with a first portion of an application that is representative of the functionality of a DVD related application. At block 606, the first portion of the application is executed by the FPGA to implement the functionality of the digital data disc drive component 417 and the decryption component 502.

As directed by the DVD navigator 510, a disc in the DVD drive 514 is read with the digital data disc drive component 417 and data in a file that may include audio and/or video data is provided to the FPGA 302 at block 608. At block 610, the data in the file is pre-processed by decrypting and decoding the file with the decryption component 502. The file may be decrypted using a decryption key extracted from the disc by the DVD navigator 510 using the digital data disc drive component 417. The pre-processed data is transmitted to the processing unit 302 at block 612. At block 614 a second portion of the application representative of DVD related functionality is executed by the processing unit 302.

The pre-processed data is processed with the second portion to check for names and contents of the file(s), separate the data into audio and video data streams, etc. at block 616. At block 618, the data that has been processed by the processing unit 302, in this example video data, is communicated back to the FPGA 304 over the standardized peripheral bus 316. The first portion of the application representative of DVD related functionality is further executed by the FPGA 302 to post process the video data with the video decoder component 504 and the graphics component 506 at block 620. At block 622, the graphic component 506 provides video content to drive the display 508.

As explained in the foregoing, the computing architecture allows integrate scalable and flexible functionality. In particular, critical and time consuming functions, such as graphic calculation, decoding or digital signal processing may be implemented in the FPGA. A flexible update of new functions is readily achieved by reprogramming the FPGA code and adding new software modules. In addition, the cooperative operation of the processor and the FPGA using the standardized bus, allows functionality that was previously external hardware and required significant customization to be internalized into the processor and the FPGA within the head unit.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A computing architecture for a mobile multimedia system used in a land-based vehicle comprised of a plurality of interconnected electrical components including a first processor, a second processor, a memory, and a field programmable gate array connected with each other by a standardized data bus for the exchange of data between the components, where, during system start-up, high priority or real-time applications are executed by the first processor and lower priority applications are executed by the second processor, where the field programmable gate array is configured, upon the system start-up or during system operation, to load data from the memory to realize application-specific functionality by logic functions implemented inside the field programmable gate array, and where upon completion of the system start-up, an application being executed is transferred from the first processor to the second processor to balance applications between the first processor and the second processor.

2. The computing architecture according to claim 1, where the field programmable gate array serves as a scalable hardware interface between at least one of the first processor and the second processor and peripheral components comprising at least two of an external memory, a display, a network, a mass storage, an input/output system controller and a peripheral input/output component.

3. The computing architecture according to claim 1, where time critical or computing intensive functions are realized by dedicated scalable hardware accelerators included in the field programmable gate array.

4. The computing architecture according to claim 1, where system functions that include graphic/video processing, digital video/versatile disc (DVD) decoding or digital signal processing (DSP) functions are shared between the application software running on at least one of the first processor and the second processor and the field programmable gate array so that the field programmable gate array is configured to perform preprocessing or post processing of input/output (I/O) data.

5. The computing architecture according to claim 1, where the memory comprises at least one of a random access memory or a flash memory, or combinations thereof.

6. The computing architecture according to claim 1, where the first processor, the second processor, and the memory are integrated as a module.

7. The computing architecture according to claim 1, where the application-specific functionality includes at least one of digital video/versatile disc (DVD) decoding, digital signal processing, and graphic functions.

8. The computing architecture according to claim 1, where the field programmable gate array includes an embedded processor core configured to implement a hardware accelerator.

9. The computing architecture according to claim 1, where the field programmable gate array is configured to load instructions comprising a first part of a multimedia vehicle-related application-specific functionality that are cooperatively executable with instructions comprising a second part of the multimedia vehicle-related application-specific functionality that are external to the field programmable gate array and are executable with at least one of the first processor and the second processor.

10. The computing architecture of claim 1, where the standardized data bus is a recognized industry standard communication bus configured to communicate data between the field programmable gate array and at least one of the first processor and the second processor, and where the field programmable gate array is configured to load instructions comprising a first part of a plurality of different and independently operable multimedia vehicle-related application-specific functionalities that are cooperatively executable with instructions comprising a respective corresponding second part of the plurality of different and independently operable multimedia vehicle-related application-specific functionalities that are external to the field programmable gate array and are executable with at least one of the first processor and the second processor.

11. The computing architecture of claim 10, where the memory is configured to store the instructions comprising the plurality of different and independently operable multimedia vehicle-related application-specific functionalities, the memory accessible by the at least one of the first processor and the second processor to download the first part of the plurality of different and independently operable multimedia vehicle-related application-specific functionalities over the recognized industry standard communication bus to the field programmable gate array.

12. The computing architecture of claim 10, where the instructions comprising the at least one of the first part of the plurality of different and independently operable multimedia vehicle-related application-specific functionalities is executable by the field programmable gate array to decode at least one of video or audio information, or combinations thereof, and the at least one of the first processor and the second processor is configured to further process the decoded at least one of video or audio information.

13. The computing architecture of claim 10, where the first processor, the second processor, the field programmable gate array, and the recognized industry standard communication bus are configured to operate as a head unit for a vehicle.

14. The computing architecture of claim 10, where at least one of the first part of the different independently operable multimedia vehicle-related application-specific functionalities is shared by at least one other of the first part of the different independently operable multimedia vehicle-related application-specific functionalities to enable communication with different respective hardware external to the field programmable gate array and the at least one of the first processor and the second processor.

15. The computing architecture of claim 10, where at least one of the first processor and the second processor is configured to access and download the instructions stored in the memory to the field programmable gate array over the predefined industry standard communication bus.

16. The computing architecture of claim 10, where the instructions comprise a plurality of multimedia related applications in support of the operation of the vehicle head unit, where at least one of the multimedia related applications is downloaded into the field programmable gate array for execution, at least one of the multimedia related applications are executed with the at least one of the first processor and the second processor, and at least one of the multimedia related applications are executed with a combination of the field programmable gate array and the at least one processor.

17. The computing architecture of claim 10, where the instructions comprise instructions to provide the functionality of a navigation system and instructions to provide the functionality of a digital video device decoder.

18. The computing architecture of claim 10, where the memory is configured to communicate over a dedicated recognized industry standard memory bus to the at least one of the first processor and the second processor, and the instructions that are downloaded to the field programmable gate array are communicated over the dedicated recognized industry standard memory bus to the at least one of the first processor and the second processor, and then over the predefined industry standard communication bus to the field programmable gate array.

19. The computing architecture of claim 1, where the field programmable gate array is configured to transfer the application being executed from the first processor to the second processor to balance applications being executed between the first processor and the second processor.

20. A computing architecture for a mobile multimedia system used in a land-based vehicle comprising: a first processor and a second processor; a memory; a field programmable gate array; and a standardized data bus interconnecting the first processor, the second processor, the memory, and the field programmable gate array, where, during system start-up, high priority or real-time applications are executed by the first processor and lower priority applications are executed by the second processor, where the field programmable gate array is configured, upon the system startup or during system operation, to load data from the memory to realize application specific functionality by logic functions implemented inside the field programmable gate array, and where upon completion of the system start-up, tasks for completion are transferred between the first processor and the second processor to level a first task load of the first processor and a second task load of the second processor with respect to one another when the leveled first task load and the leveled second task load are associated with a first overall execution time lower than a second overall execution time associated with the first task load and the second task load being unleveled.

21. The computing architecture of claim 20, where the field programmable gate array is configured to:
determine that the first overall execution time is lower than the second overall execution time; and
transfer the tasks for completion between the first processor and the second processor in response to the determination.

22. A method of operating a mobile multimedia system used in a land-based vehicle, the mobile multimedia system comprising a plurality of interconnected electrical components including a first processor, a second processor, a memory, and a field programmable gate array connected with each other by a standardized data bus for the exchange of data, the method comprising: selecting the first processor to execute high priority or real-time applications during start-up of the mobile multimedia system; selecting the second processor to execute lower priority applications during the start-up of the mobile multimedia system; loading, with the field programmable gate array during the start-up of the mobile multimedia system or during operation of the mobile multimedia system, data from the memory to realize application-specific functionality by logic functions implemented inside the field programmable gate array; and balancing, upon completion of the start-up of the mobile multimedia system, a first task load of the first processor with a second task load of the second processor.

23. The method of claim 22 further comprising determining an overall execution time associated with the first task load and the second task load, where balancing the first task load with the second task load comprises balancing the first task load with the second task load to achieve a shorter overall execution time than the determined overall execution time associated with the first task load and the second task load prior to the balancing.

* * * * *

UNITED STATES PATENT AND TRADEMARK OFFICE
CERTIFICATE OF CORRECTION

PATENT NO. : 7,664,931 B2 Page 1 of 1
APPLICATION NO. : 11/173266
DATED : February 16, 2010
INVENTOR(S) : Erforth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 91 days.

Signed and Sealed this

Seventh Day of December, 2010

David J. Kappos
*Director of the United States Patent and Trademark Office*